(12) United States Patent
Mak (10) Patent No.: US 10,878,306 B2
(45) Date of Patent: Dec. 29, 2020

(54) RFID TRANSPONDER ANTENNA

(71) Applicant: STAR Systems International Ltd., Kwai Chung (HK)

(72) Inventor: Chi Lun Mak, Kwai Chung (HK)

(73) Assignee: STAR Systems International Limited, Kwai Chung (HK)

( * ) Notice: Subject to any disclaimer, the term of this patent is extended or adjusted under 35 U.S.C. 154(b) by 212 days.

(21) Appl. No.: 16/208,988

(22) Filed: Dec. 4, 2018

(65) Prior Publication Data
US 2020/0175349 A1   Jun. 4, 2020

(51) Int. Cl.
*G06K 19/077*  (2006.01)

(52) U.S. Cl.
CPC ............... *G06K 19/07777* (2013.01)

(58) Field of Classification Search
CPC ......... G06K 19/07777; G06K 19/0726; G06K 19/07794; H01Q 1/2208
See application file for complete search history.

(56) References Cited

U.S. PATENT DOCUMENTS

2007/0052613 A1*  3/2007  Gallschuetz ..... G06K 19/07756
                                                    343/860
2009/0121030 A1*  5/2009  Kato ................... H04B 5/0012
                                                    235/492

* cited by examiner

*Primary Examiner* — Sonji N Johnson
(74) *Attorney, Agent, or Firm* — The Webb Law Firm (57) ABSTRACT

An antenna for a Radio Frequency Identification (RFID) transponder, including: an inductive loop with terminals for connection with an RFID chip; and an electromagnetically resonant structure positioned in a same plane as the inductive loop; wherein a resonant frequency of the resonant structure corresponds to a designed operating frequency in a frequency band of the RFID transponder; and wherein the electromagnetically resonant structure is electrically and physically separated from the inductive loop and capacitively coupled to the inductive loop; and the electromagnetically resonant structure includes one or more electrical discontinuities within the electromagnetically resonant structure; wherein the antenna is adapted and configured to have a non-omni directional radiation pattern and with an input impedance substantially conjugate matches an input impedance of the RFID chip at the designed operating frequency.

14 Claims, 9 Drawing Sheets

RFID TRANSPONDER ANTENNA

TECHNICAL FIELD

The present invention relates to a Radio Frequency Identification (RFID) transponder antenna.

BACKGROUND

RFID is a technique used to identify objects by means of electromagnetic waves or radio frequency. An object can be tagged with an electronic code responding label. An electronic code responding label comprises an antenna and an integrated circuit.

In practice, RFID provides a quick and affordable means to identify objects. Upon receiving a valid interrogating signal from an interrogating source, such as from an interrogating antenna of an RFID reader, the electronic code responding label responds according to its designed protocol. As the electronic code responding label has an identification code which relates to the object that the electronic code responding label is attached to, by communicating with the electronic code responding label to retrieve the identification code representing the object, one can identify the presence of the object simply by identifying the presence of the electronic code responding label. An electronic code responding label sometimes is known as a label, tag, inlay, or a transponder, etc.

There are mainly two types of tags, active and passive. An active tag would have its own battery source, has a greater read range than a passive RFID tag. However, an active tag is limited by the lifetime of its battery, and is more expensive and bulky than a passive tag. A passive tag, on the other hand, is a tag energised by an interrogating signal from an interrogating source (such as an RFID reader). It has relatively shorter read range but has the advantage of cheaper price, smaller form factor, and the convenience of not needing replacement (due to the battery life) as compared with an active tag. It is vital that the antenna of a passive tag is designed well so that the interrogating signal can be received optimally to energise the chip of the passive tag. When the chip of the passive tag is powered, the antenna is used by the chip to transmit signal back to the RFID reader. With this back and forth wireless communication, a communication link is setup successfully between the RFID reader and the passive tag. A common and simple form of a passive RFID tag is a one-piece structure of inlay i.e. the transponder is a single-layered design realized on plastic material.

The antenna design for an RFID tag depends on the operating frequency of the RFID tag. Common operating range includes LF band, HF band, UHF band, and microwave band. For the antenna design of this disclosure, it is design for RFID tags operating within the UHF band. The global UHF RFID frequency band covers 860-960 MHz. For Europe, the ETSI band covers 865-868 MHz. In US, the FCC band covers 902-928 MHz. Accordingly, an antenna design, which allows fine-tuning for optimization in relation to the band, would be desirable.

It is known that for designing a UHF transponder antenna, impedance matching between the antenna and the RFID chip is very important. This is to ensure that the power harvested by the antenna is transfer to the RFID chip to energise the RFID chip, and also to ensure the power from the chip can be transferred to the antenna effectively (backscattering). For optimal power transfer between the antenna and the RFID chip, the input impedance of the RFID chip should be the conjugate match of the impedance of the antenna. More specifically, if the input impedance of the RFID chip is R−jX ohm, which is frequency dependent, where R is the real part, and −X is the imaginary part of the chip's input impedance, the antenna input impedance conjugate matches the input impedance of the RFID chip when the antenna input impedance is R+jX ohm. When there is a conjugate match between the impedance of the RFID chip and the impedance of the RFID antenna, a maximum power transfer from each other can occur.

Besides impedance matching, for the best read range performance, an antenna of an RFID tag has to be custom designed to ensure the antenna gain, radiation efficiency, radiation pattern, and polarization of the antenna is well-designed, to fulfill some design considerations or constraints such as size requirement, material to be attached (or mounted), operating frequency band, etc.

The present disclosure presents an alternative and ease-of-tuning (or optimizing) antenna design for an RFID tag.

SUMMARY

According to a first aspect of the present invention, there is provided an antenna for a Radio Frequency Identification (RFID) transponder, comprising: an inductive loop with terminals for connection with an RFID chip; and an electromagnetically resonant structure positioned in a same plane as the inductive loop; wherein a resonant frequency of the resonant structure corresponds to a designed operating frequency in a frequency band of the RFID transponder; and wherein the electromagnetically resonant structure is electrically and physically separated from the inductive loop and capacitively coupled to the inductive loop; and the electromagnetically resonant structure comprises one or more electrical discontinuities within the electromagnetically resonant structure; wherein the antenna is adapted and configured to have a non-omni directional radiation pattern and with an input impedance substantially conjugate matches an input impedance of the RFID chip at the designed operating frequency.

In one form, one or more parameters of the one or more electrical discontinuities is adjustable to change a performance of the antenna. In one form, the electromagnetically resonant structure comprises a single electrical discontinuity which separates the electromagnetically resonant structure into two mirrored parts.

In one form, the electromagnetically resonant structure comprises a first portion and a second portion separated by one electrical discontinuity; wherein the first portion comprises an elongated electrical conductive segment; and the second portion comprises the remaining of the electromagnetically resonant structure. In one form, the second portion includes a further electrical discontinuity which separates the second portion into two mirrored parts. In one form, the second portion comprises two mirrored parts, each positioned at a different end of the elongated electrically conductive segment.

In one form, the antenna is printed on a dielectric material; and wherein the dielectric material includes perforated lines through one or more gaps provided by the one or more electrical discontinuities such that part of the antenna can be separated from the antenna by tearing through the perforated lines.

According to a second aspect of the present invention, there is provided an RFID tag or RFID transponder with antenna according to the first aspect of the present invention and/or the various forms of the first aspect.

BRIEF DESCRIPTION OF DRAWINGS

Embodiments of the present invention will be discussed with reference to the accompanying drawings wherein.

DESCRIPTION OF EMBODIMENTS

The present disclosure introduces a novel and inventive antenna design for RFID tags. In particular, one or more discontinuities are introduced within a resonant structure of the transponder antenna.

In a broad form, the transponder antenna includes an inductive loop and a resonant structure, where the resonant structure comprises one or more discontinuities within a resonant structure.

Note that an inductive loop can take many forms, as long as the loop is inductive as opposed to capacitive. The term loop also does not necessitate the induction loop to be a single loop, or resemble a coil. In fact, it can be a square-loop, rectangular loop, multi-turn loop, or even with discontinuities, etc., as long as it is inductive. Being inductive does not mean that it contains no capacitance. A person skilled in the art would understand that capacitance exists in an inductive loop, but the degree of capacitance is lesser than its degree of inductance.

A resonant structure is a structure where, at a frequency of interest, the inductive impedance and capacitance impedance of circuit elements cancel each other. In relation to antenna design, resonant frequency is an important parameter. In simple form, a designer would want the resonant frequency of an antenna to be within the operating band (for UHF RFID antenna, it would be within the band of 860 MHz to 960 MHz). Depending on applications and regulations of some countries, the antenna can be specifically designed to resonate at a particular frequency. In other words, the resonant frequency of the resonant structure corresponds to a designed operating frequency of an RFID tag.

The term "discontinuity" or its plural form "discontinuities" in this specification, unless stated otherwise, is to be understood as follows: Discontinuity means there exists a physical gap that is not electrically conductive. In the context of a discontinuity within a resonant structure, it means that the discontinuity separates physically and electrically the resonant structure into two different portions. The portions can be similar, mirrored, rotational-symmetrical or completely different.

The inductive loop and the resonant structure can be made of the same material or different materials. In one form, they are made of copper on a dielectric material (such as a glass board, plastic sheet or a FR-4 PCB board). Of course they can be made with other conductive material deemed suitable by a person skilled in the art. The antenna can be made through various known manufacturing processes, such as printing, etching, milling etc. A complete RFID tag is then made by attaching a chip to an antenna. One common form is known as RFID inlay. It comprises a chip and aluminum, copper or silver antenna bonded to a polyethylene terephthalate (PET) layer that is delivered to the label maker "dry" (without adhesive) or "wet" (attached to a pressure sensitive liner). The inlay is adhered to the back side of the label and printed and encoded in an RFID printer.

The antenna of the present disclosure also requires the inductive loop and the resonant structure to be at a same plane. It should be understood that an antenna plane refers to a flat surface on which majority of the antenna is located. It follows that the plane where majority of the inductive loop is found, is the same plane where majority of the resonant structure is found. In a broad sense, it does not require "all" parts of the inductive loop and the resonant structure to be at a same plane, just "majority".

An RFID chip is then connected to the antenna. In this disclosure, the RFID chip is connected to the inductive loop, and not connected to the resonant structure. When connected, current flows from the inductive loop to the RFID chip, to power up the RFID chip, and continue to supply power to the RFID chip to allow the RFID chip to respond to an interrogating signal accordingly.

The resonant structure is capacitively coupled to the inductive loop. They are not connected directly. They are separated physically and electrically. However, they cannot be too far off to allow capacitive coupling. Such a capacitive coupling allows, the resonant structure to receive energy from the interrogating signal, then couples the receive energy to the inductive coil, which then energise the RFID chip connected to the inductive coil.

For this disclosure, the antenna is adapted and configured to have a non-omni directional radiation pattern and with an input impedance substantially conjugate matches an input impedance of the RFID chip at the operating frequency.

Radiation pattern refers to the directional (angular) dependence of the strength of the radio waves from the antenna or from another source to the antenna. Due to the principle of reciprocity in antenna theory, the strength of radio waves at a direction from and to an antenna is the same. A directional radiation pattern simply means that there is a direction with a strength much stronger than those of the other directions. A directional radiation pattern is different from a uniform radiation pattern where the strength is the same in all directions (i.e. the Omni-directional radiation pattern with antenna gain of 0 dBi).

As described previously, conjugate matches between the impedance of the RFID chip and the impedance of the RFID antenna is important to allow maximum power transfer from each other. In practice, a perfect conjugate match is often not achieved, and a substantially conjugate match is sufficient for an RFID tag to function at an adequate read range. In the context of this disclosure, a substantially conjugate match means that there is less than 20% power loss, where percentage of power loss ($P_{lost}/P_{available}$) can be calculated based on:

$$\frac{P_{lost}}{P_{available}} = \left|\frac{Z_{ant} - Z_{cct}^*}{Z_{ant} + Z_{cct}}\right|^2 = |\text{reflection coefficient } (S_{11})|^2 \quad (1)$$

where $Z_{ant}$ is the impedance of the antenna and $Z_{cct}$ is the impedance of the chip. * means conjugate impedance.

The present disclosure, with the addition of one or more discontinuities within the resonant structure, and with the resonant structure coupled to the inductive loop, and with the inductive loop connected to the RFID chip, offers the benefit of easing the antenna design process and optimization (fine-tuning) process for an RFID tag. The reason is that the position and size/dimension of each of the one or more discontinuities provide adjustable parameters. By adjusting the adjustable parameters of the one or more discontinuities allows other parameters to be fixed, parameters of other parts, such as the inductive loop can be kept unchanged.

Further, without the one or more discontinuities, it was discovered that there is no easy way to introduce capacitance into the resonant structure. With the one or more discontinuities, the gaps or separations provided by the one or more discontinuities provides capacitance, which can be easily tuned for performance optimization. Further, the separated resonant structure provides multiple parts that can be moved individually so that the relative distance (or separations) between other structure (e.g. the inductive-loop structure) can be individually tuned, and this provides extra flexibility in antenna design. The resonant structure can be made asymmetrically to fulfill a particular requirement (e.g. asymmetrical radiation pattern).

Figure 1:
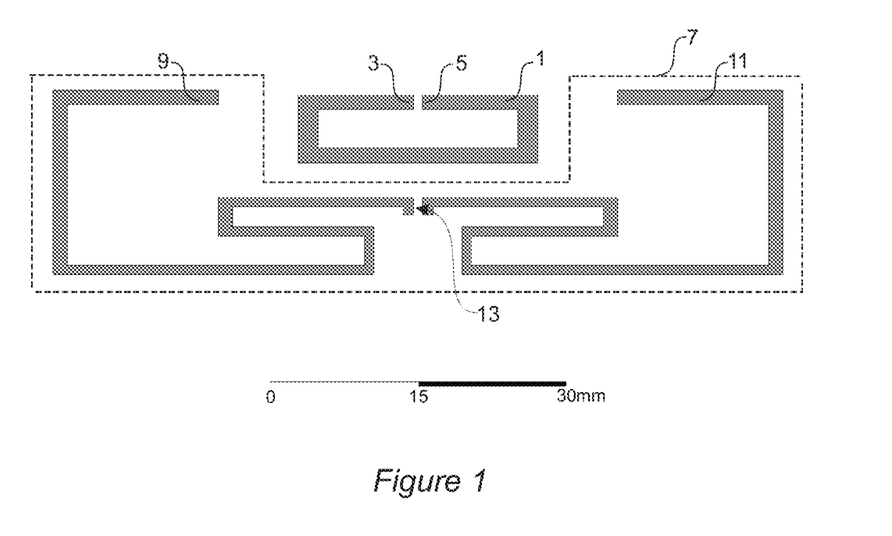
FIG. 1 depicts one embodiment of the present disclosure.

FIG. 1 depicts one embodiment of the present disclosure. In particular, FIG. 1 shows an RFID transponder antenna with a discontinuity within its resonant structure. The RFID antenna comprises two main parts, an inductive loop 1 and a resonant structure 7. The inductive loop 1 includes two terminals 3 and 5 for connection with an RFID chip. The resonant structure comprises two mirrored extending parts 9 and 11 separated by a discontinuity 13. The lengths and shapes of the two mirrored parts 9 and 11 and the size of the discontinuity 13 provides many parameters which can be adjusted such that the resonant frequency of the resonant structure and the inductive loop correspond to a design operating frequency of an RFID system. For example, 915 MHz, 900 MHz, or 875 MHz.

Figure 2:
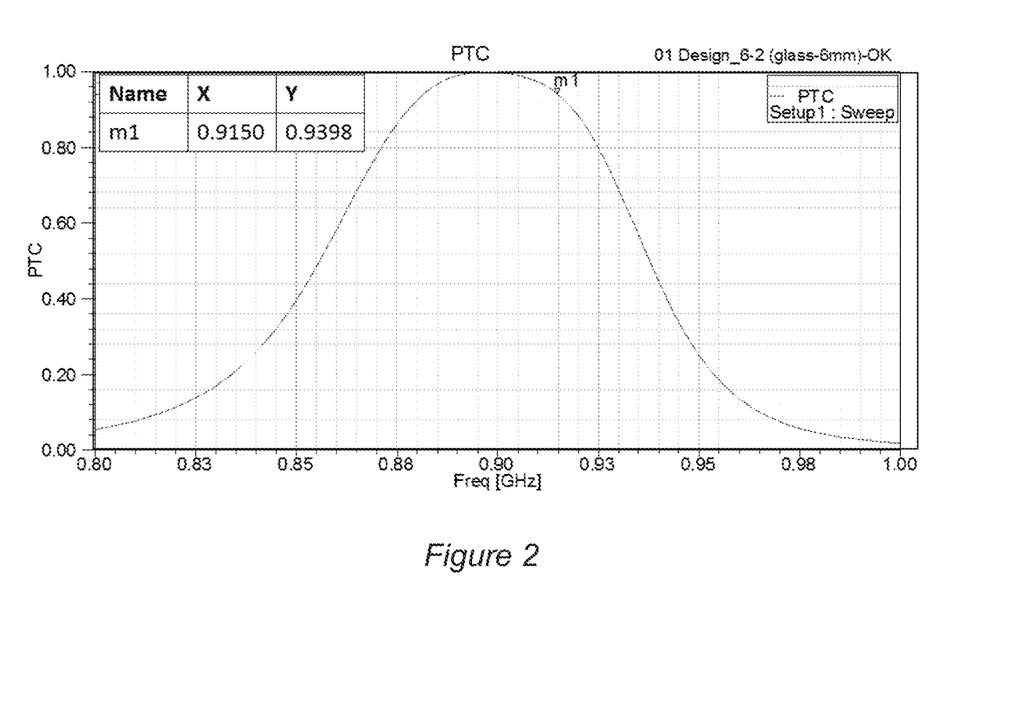
FIG. 2 depicts simulation results of the RFID transponder antenna of FIG. 1 when the RFID transponder antenna of FIG. 1 is mounted on top of a 6 mm glass.

FIG. 2 depicts simulation results of the RFID antenna of FIG. 1 when the RFID transponder antenna of FIG. 1 is mounted on top of a 6 mm glass. "PTC" in the figure stands for Power Transfer Coefficient. When perfect resonant occurs, PTC equals to 1. As it can be observed, the resonant frequency of the RFID antenna is at a frequency very near to 0.9 GHz, within the global RFID band of 860 to 960 MHz. The resonant frequency can be fine-tuned (moves up or down from the near resonant frequency of 0.9 GHz as shown in FIG. 2) to the desired frequency depending on the application of the RFID tag using the antenna of FIG. 1, and also depends on the country the RFID is being used as the band designated for RFID application may differ from country to country.

Figure 3:
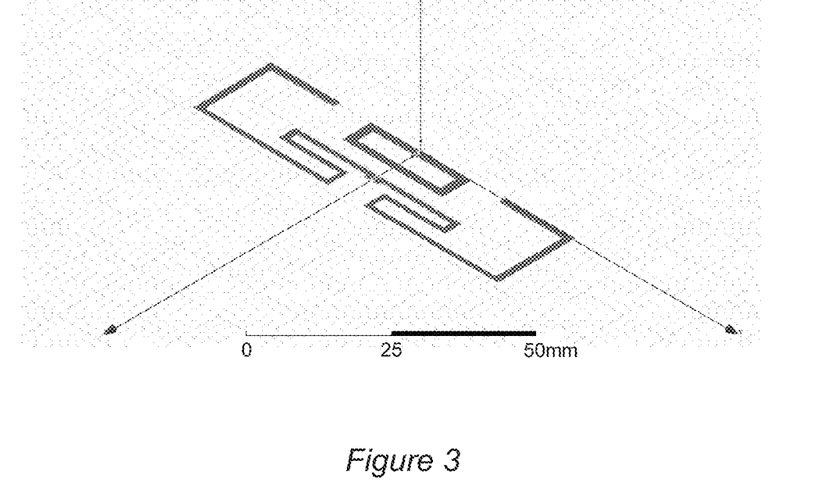
FIGS. 3 and 4 depict an orientation of the RFID transponder antenna of FIG. 1 and its corresponding radiation pattern respectively.
Figure 4:
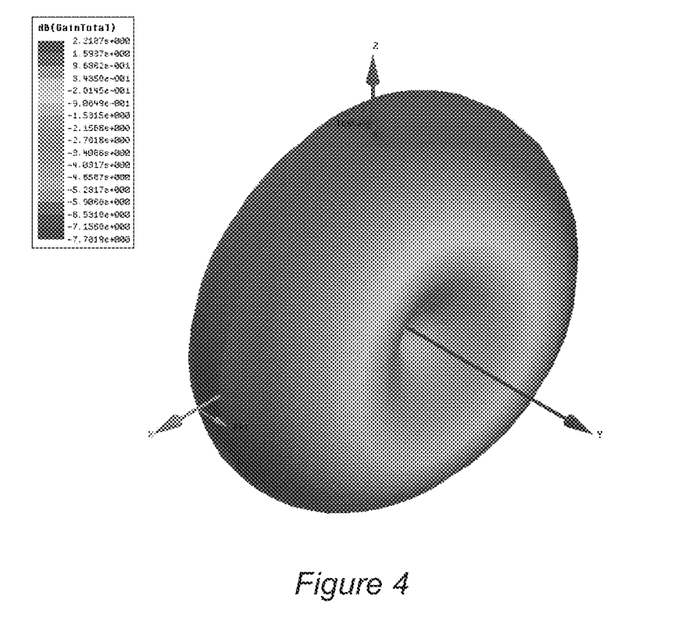

FIGS. 3 and 4 depict an orientation of the RFID antenna of FIG. 1 and its corresponding radiation pattern respectively. As can be observed, the radiation pattern resembles a doughnut shape and is similar to the radiation pattern of a dipole antenna. The antenna gain is around 2.2 dBi. This radiation pattern is not omni-directional in that the antenna performs better in a certain direction than the other. This is useful, as the maximum read distance of an RFID tag can be increased when the RFID tag is positioned correctly by having the most gain direction facing the transmit antenna of an RFID interrogator, and having both polarization of transponder antenna and RFID interrogator antenna match.

Figure 5:
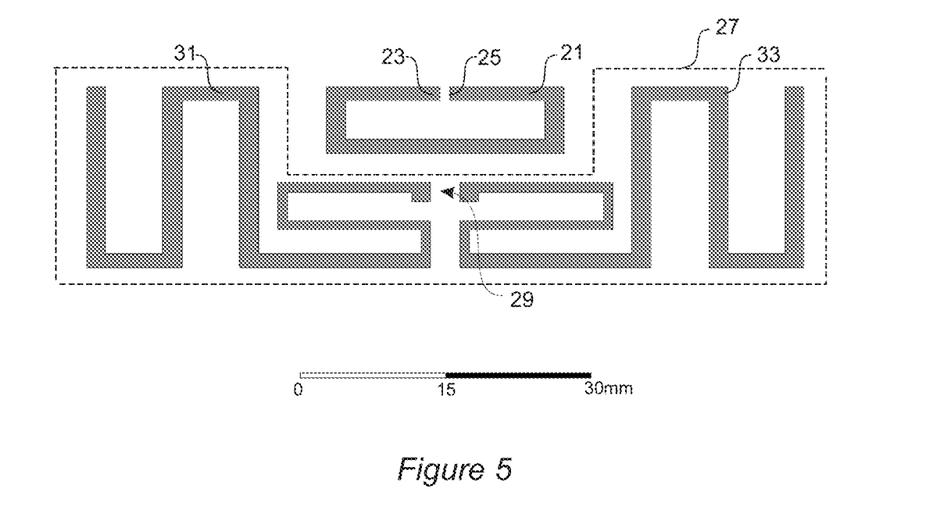
FIG. 5 depicts another embodiment of the present disclosure.

FIG. 5 depicts another embodiment of the present disclosure. In particular, FIG. 5 shows another RFID antenna with a discontinuity within its resonant structure. The RFID antenna comprises two main parts, an inductive loop 21 and a resonant structure 27. The inductive loop 21 includes two terminals 23 and 25 for connection with an RFID chip. The resonant structure comprises two mirrored extending parts 31 and 33 separated by a discontinuity 29. Similar to the design of FIG. 1, the lengths and shapes of the two mirrored parts 31 and 33 and the size of the discontinuity 29 provides many parameters which can be adjusted such that the resonant frequency of the resonant structure and the inductive loop correspond to a design operating frequency of an RFID system. For example, 915 MHz, 900 MHz, or 875 MHz.

Figure 6:
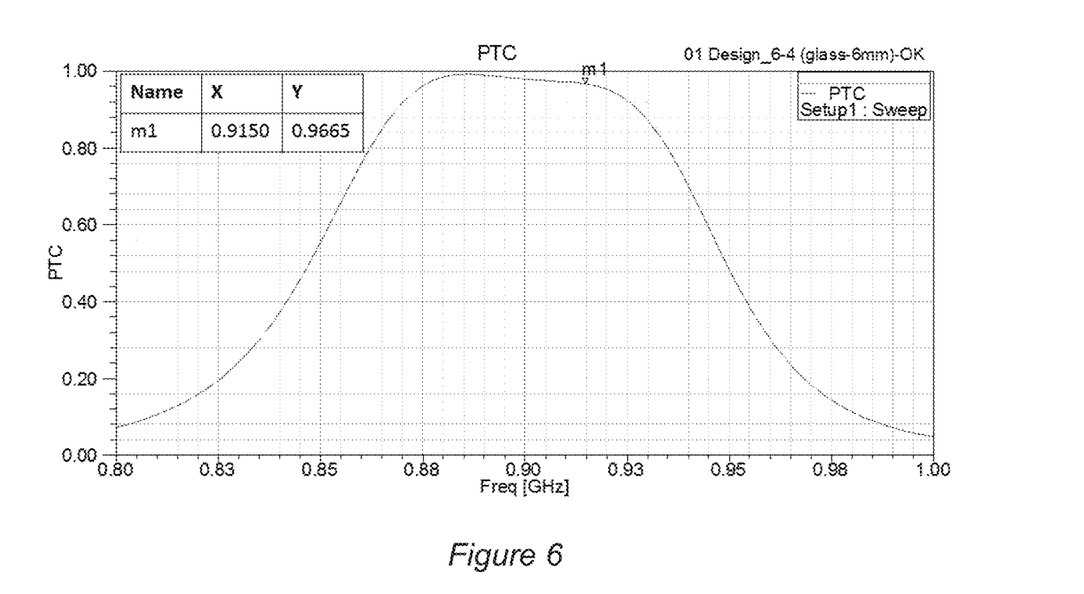
FIG. 6 depicts simulation results of the RFID transponder antenna of FIG. 5 when the RFID antenna of FIG. 5 is mounted on top of a 6 mm glass.

FIG. 6 depicts simulation results of the RFID transponder antenna of FIG. 5 when the RFID transponder antenna of FIG. 5 is mounted on top of a 6 mm glass. "PTC" in the figure stands for Power Transfer Coefficient. When perfect resonant occurs, PTC equals to 1. As it can be observed, this RFID transponder antenna has a relatively broader bandwidth as compared with the RFID transponder antenna of FIG. 1. A broad band antenna means that the RFID antenna can function better across the entire band of the global RFID band of 860 MHz to 960 MHz.

Figure 7:
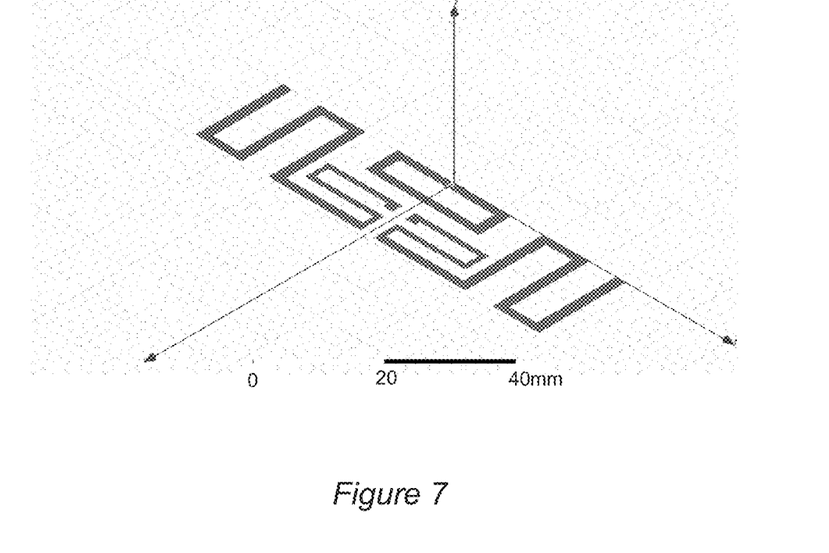
FIGS. 7 and 8 depict an orientation of the RFID transponder antenna of FIG. 5 and its corresponding radiation pattern respectively.
Figure 8:
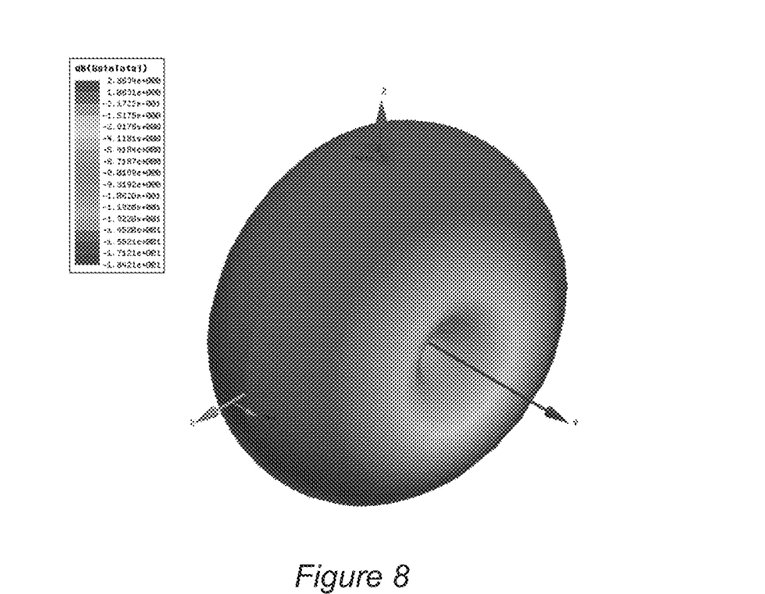
Figure 9:
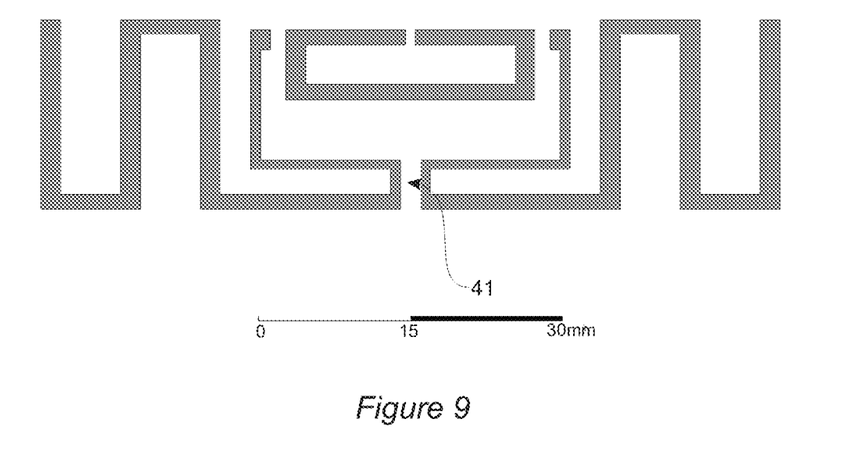
FIGS. 9 to 15 show more different embodiments of RFID transponder antennas.
Figure 10:
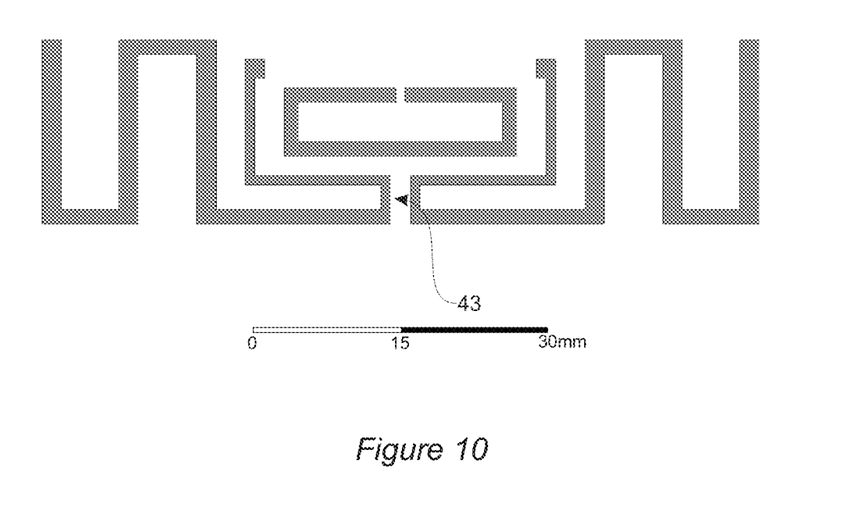
Figure 11:
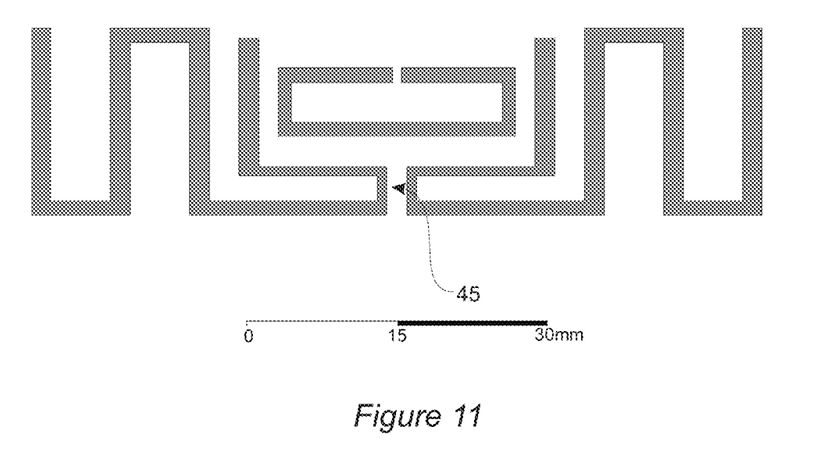
Figure 12:
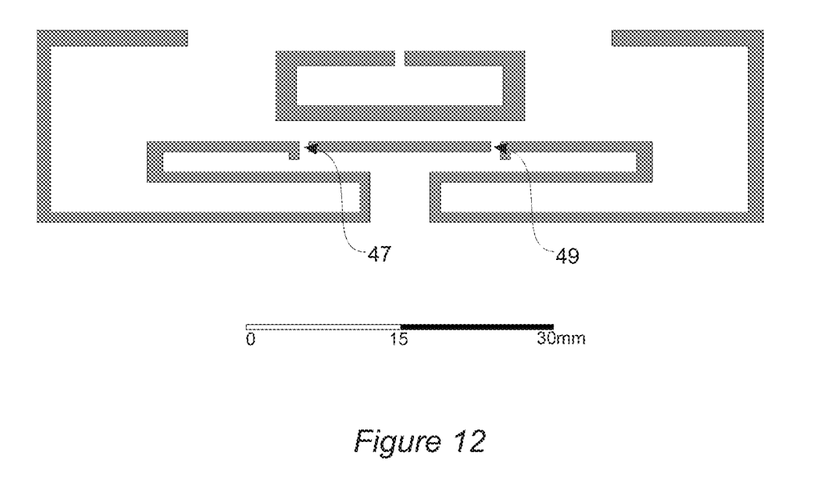

FIGS. 7 and 8 depict an orientation of the RFID antenna of FIG. 5 and its corresponding radiation pattern respectively. Similar to the radiation pattern of the antenna of FIG. 1, the radiation pattern of the antenna of FIG. 5 resembles a doughnut shape and with similar antenna gain.

FIGS. 9 to 15 show more different embodiments of RFID antennas, each with one of more discontinuities within a resonant structure of the RFID antenna. For the antenna of FIG. 9, there is a discontinuity 41; antenna of FIG. 10, a discontinuity 43; antenna of FIG. 11, a discontinuity 45; antenna of FIG. 12, two discontinuities at 47 and 49; antenna of FIG. 13, three discontinuities 51, 53 and 55; antenna of FIG. 14, a discontinuity 57; and antenna of FIG. 15, a discontinuity 59.

While the antennas presented here are with resonant structure extending in two opposite directions in a mirrored fashion, it is not a necessity for the present disclosure to function. As mentioned previously, it is the gap or the discontinuity of the resonant structure that is coupled to an inductive loop that allows the present disclosure to function. The mirrored extending parts are designed in mirrored form for aesthetic purposes and provide a more regular shape radiation pattern (i.e. a regular doughnut shape rather than an irregular shape). In other forms, the two extending resonant structure parts are two rotational-symmetrical parts or two differently designed parts.

Figure 13:
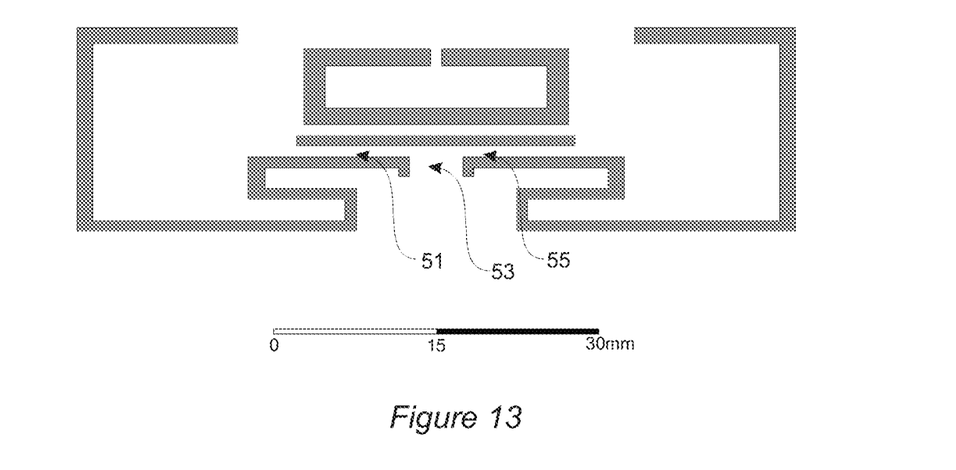
Figure 14:
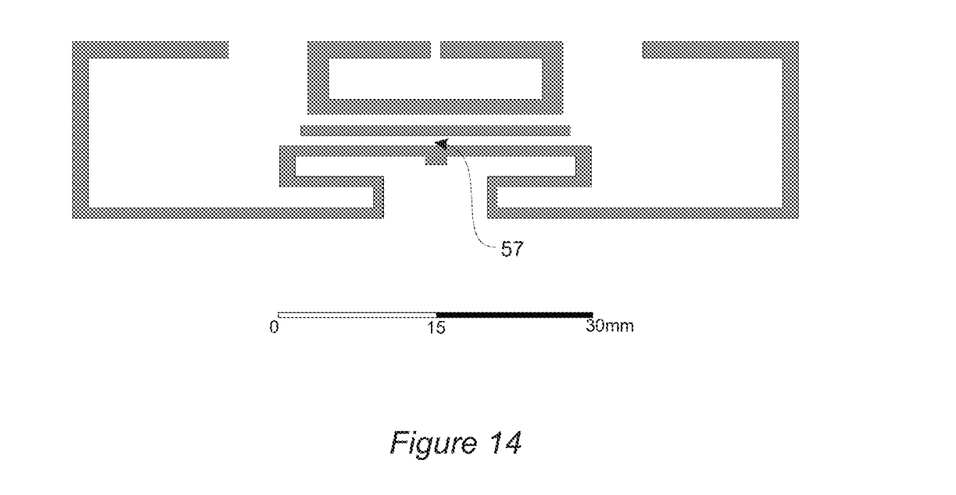
Figure 15:
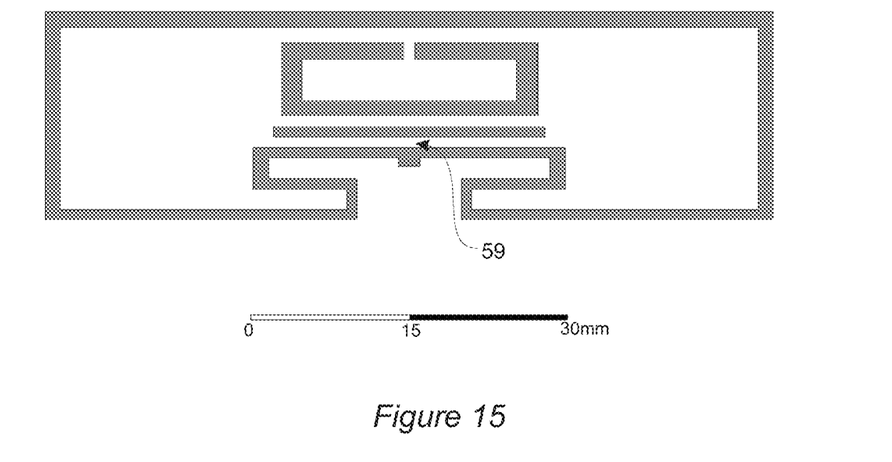

Antennas of FIGS. 13 to 15 are further elaborated as the resonant structure of each of them comprises a first portion comprising an elongated electrical conductive segment, and a second portion comprises the remaining of the electromagnetically resonant structure. The first portion and the second portion are separated by one electrical discontinuity. The second portion may comprise additional one or more discontinuities.

Figure 16:
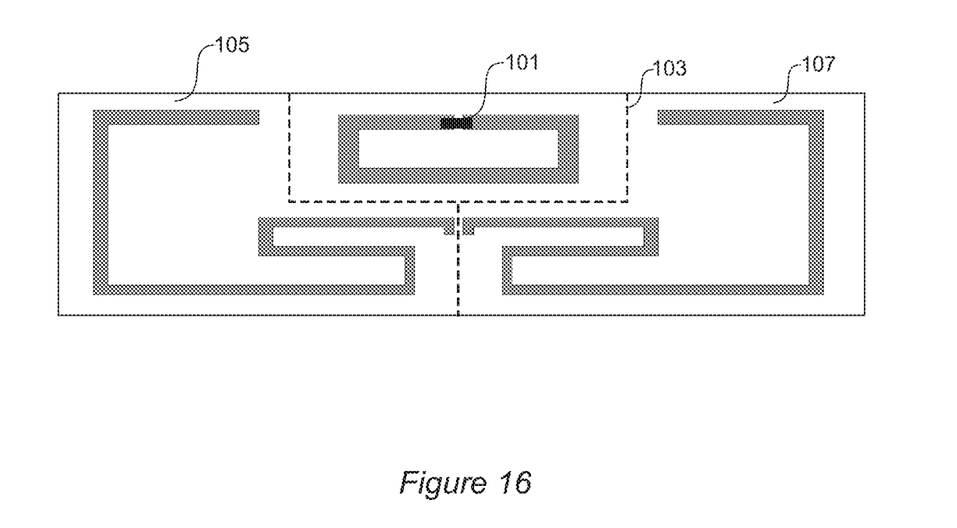
FIG. 16 depicts a fully functional RFID tag, with the RFID transponder antenna of FIG. 1 printed on a plastic sheet.

FIG. 16 depicts a fully functional RFID tag, with the RFID antenna of FIG. 1 printed on a plastic sheet. An RFID chip 101 is attached to the terminals of the inductive loop. It can be seen that there are perforated lines 103 which allow parts 105 and 107 to be separated from the inductive loop connected to the RFID chip 101. Since the inductive loop, and parts of the resonant structure separated by one or more discontinuities can be separated individually, each of them can be individually taken out for different purposes or applications, or for prototyping of other designs using the same RFID chip.

Further, the introduction of a perforated line on plastic inlay allows a user to easily detach part of the inlay, without physically damaging the other portion of the transponder, for some other purposes or applications, e.g. simply take out the resonant loop structure only or with some part(s) of the resonant structure for short-range or near-filed communication purposes.

Further, the perforated lines provide an alternative way to improve the security feature of the tag. Instead of breaking the RFID chip on removal, the perforated line will guide how the label will be broken when torn off. As a result, when the tag is tampered, the original read distance is significantly reduced but still keeping the chip ID readable at very close distance (near-field readable but not far-field). Therefore, adding this feature to current NRNT (non-removable non-transferrable) feature will enhance the overall physical security feature.

In a form, an RFID tag with an RFID transponder antenna which is with one or more discontinuity within a resonant structure coupled to an inductive loop connected to an RFID chip is applied on windshield, and headlamp, etc. as a vehicle transponder in electronic tolling collection (ETC), and automatic vehicle identification (AVI), etc. In one form, such an RFID tag is applied on label or sticker for inventory tracking, access control, etc. It finds its use in logistics and supply chain, as the movement of an item can be tracked automatically using an RFID system.

While the antenna of the present disclosure is designed to work for a passive tag, there is no reason why the designed antenna cannot be used in an active tag.

The antenna design of the present disclosure departs from traditional antenna design for an RFID tag. In most of the single-layered transponder designs in the market, the resonant structure is basically the major resonant part of the antenna, which is usually half-lambda long without any discontinuity. For example, a half-wave dipole type antenna.

Further, an antenna designer would not contemplate to introduce discontinuity along the resonant structure. The reason is that by having one or more discontinuity without purpose, proper design, or randomly, the electrical resonant length of the resonant structure will be shortened, thus will significantly alter the resonant frequency. Once the resonant frequency moves away from the operating frequency of an RFID system, the RFID tag would be difficult to be read (very short read range), or can't be read at all. Therefore it would be going against the rule of thumb of antenna design to break the resonant structure (such as introducing one or more discontinuities) in the design of an RFID antenna for an RFID tag.

In addition, with the introduction of one or more discontinuities, an RFID tag can be separated and applied separated to items with multiple assembly parts or surfaces so that when they come or are assembled together correctly, it becomes the original RFID tag, and therefore can easily be read by an RFID reader.

Figure 17:
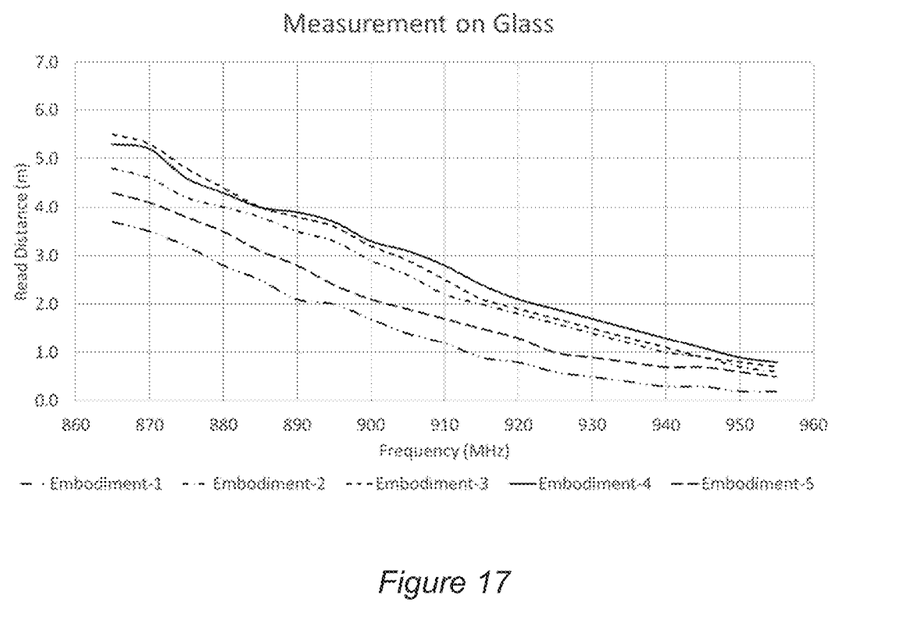
FIG. 17 shows measurement results of prototypes of RFID tags mounted on glass with RFID transponder antennas based on the transponder antennas presented in this disclosure.

FIG. 17 shows measurement results of prototypes of RFID tags mounted on glass with RFID transponder antennas based on the antennas presented in this disclosure. In particular, Embodiment 1 referred to in FIG. 17 uses an antenna of FIG. 1, Embodiment 2 uses an antenna of FIG. 5, Embodiment 3 uses an antenna of FIG. 9, Embodiment 4 uses an antenna of FIG. 10, and Embodiment 5 uses an antenna of FIG. 11. As can be seen, the RFID tags perform relatively well at the 860 MHz end of the RFID band of 860 MHz to 960 MHz, with read range of approximately 3.5 m to 5.5 m. In Embodiment 1, the RFID antenna has an input impedance of 10.4+178 j ohm at 915 MHz. The RFID chip in this example has a chip impedance of 16-181 j ohm. The power loss is <10% following the equation of (1).

Figure 18:
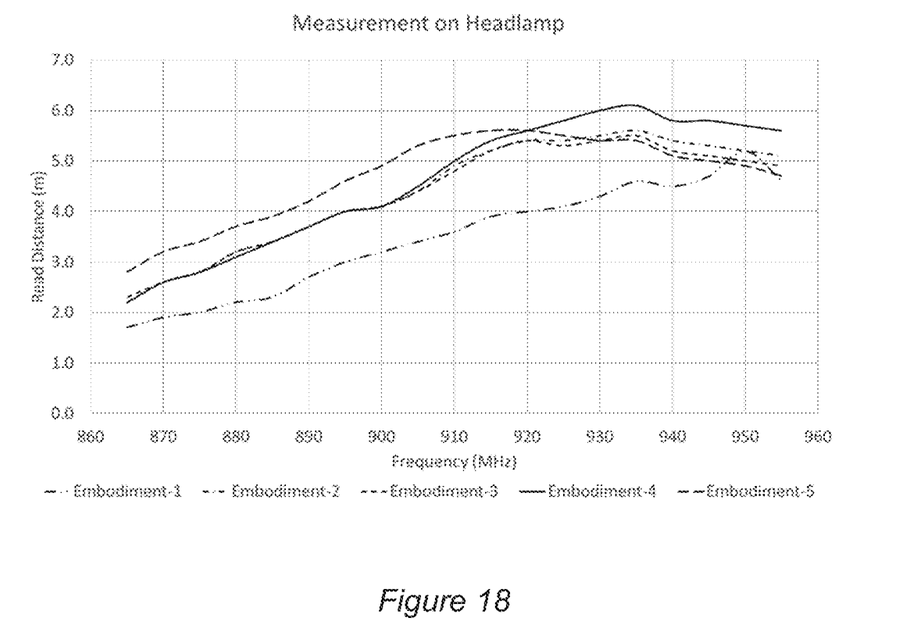
FIG. 18 shows measurement results of prototypes of RFID tags mounted on a vehicle headlamp with RFID transponder antennas based on the transponder antennas presented in this disclosure.

FIG. 18 shows measurement results of prototypes of RFID tags mounted on a vehicle headlamp with RFID transponder antennas based on the antennas presented in this disclosure. In particular, Embodiment 1 referred to in FIG. 17 uses an antenna of FIG. 1, Embodiment 2 uses an antenna of FIG. 5, Embodiment 3 uses an antenna of FIG. 9, Embodiment 4 uses an antenna of FIG. 10, and Embodiment 5 uses an antenna of FIG. 11. As can be seen, the RFID tags perform relatively well at the 960 MHz end of the RFID band of 860 MHz to 960 MHz, with read range of approximately 4.5 m to 5.5 m.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement or any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. An antenna for a Radio Frequency Identification (RFID) transponder, comprising:
    an inductive loop with terminals for connection with an RFID chip; and
    an electromagnetically resonant structure positioned in a same plane as the inductive loop; wherein a resonant frequency of the resonant structure corresponds to a designed operating frequency in a frequency band of the RFID transponder; and wherein the electromagnetically resonant structure is electrically and physically separated from the inductive loop and capacitively coupled to the inductive loop; and the electromagnetically resonant structure comprises one or more electrical discontinuities within the electromagnetically resonant structure;

wherein the antenna is configured to have a non-omni directional radiation pattern and with an input impedance substantially conjugate matches an input impedance of the RFID chip at the designed operating frequency.

2. The antenna of claim 1, wherein one or more parameters of the one or more electrical discontinuities is adjustable to change a performance of the antenna.

3. The antenna of claim 1, wherein the electromagnetically resonant structure comprises a single electrical discontinuity which separates the electromagnetically resonant structure into two mirrored parts.

4. The antenna of claim 1, wherein the electromagnetically resonant structure comprises a first portion and a second portion separated by one electrical discontinuity; wherein the first portion comprises an elongated electrical conductive segment; and the second portion comprises the remaining of the electromagnetically resonant structure.

5. The antenna of claim 4, wherein the second portion includes a further electrical discontinuity which separates the second portion into two mirrored parts.

6. The antenna of claim 4, wherein the second portion comprises two mirrored parts, each positioned at a different end of the elongated electrically conductive segment.

7. The antenna of claim 1, wherein the antenna is printed on a dielectric material; and wherein the dielectric material includes perforated lines through one or more gaps provided by the one or more electrical discontinuities such that part of the antenna can be separated from the antenna by tearing through the perforated lines.

8. A Radio Frequency Identification (RFID) transponder, comprising:
   an RFID chip; and
   an RFID antenna comprising:
   an inductive loop with terminals connected to the RFID chip; and
   an electromagnetically resonant structure positioned in a same plane as the inductive loop; wherein a resonant frequency of the resonant structure corresponds to a designed operating frequency in a frequency band of the RFID transponder; and wherein the electromagnetically resonant structure is electrically separated from the inductive loop and capacitively coupled to the inductive loop; and the electromagnetically resonant structure comprises one or more electrical discontinuities within the electromagnetically resonant structure;

wherein the RFID antenna is configured to have a non-omni directional radiation pattern and with an input impedance substantially conjugate matches an input impedance of the RFID chip at the designed operating frequency.

9. The RFID transponder of claim 8, wherein one or more parameters of the one or more electrical discontinuities is adjustable to change a performance of the antenna.

10. The RFID transponder of claim 8, wherein the electromagnetically resonant structure comprises a single electrical discontinuity which separates the electromagnetically resonant structure into two mirrored parts.

11. The RFID transponder of claim 8, wherein the electromagnetically resonant structure comprises a first portion and a second portion separated by one electrical discontinuity; wherein the first portion comprises an elongated electrically conductive segment; and the second portion comprises the remaining of the electromagnetically resonant structure.

12. The RFID transponder of claim 11, wherein the second portion includes a further electrical discontinuity which separates the second portion into two mirrored parts.

13. The RFID transponder of claim 11, wherein the second portion comprises two mirrored parts, each positioned at a different end of the elongated electrically conductive segment.

14. The RFID transponder of claim 8, wherein the antenna is printed on a dielectric material; and wherein the dielectric material includes perforated lines through one or more gaps provided by the one or more electrical discontinuities such that part of the antenna can be separated from the antenna by tearing through the perforated lines.

* * * * *